United States Patent
Burrows et al.

[15] 3,665,054
[45] May 23, 1972

[54] DYEABLE POLYAMIDES CONTAINING POLYSTYRENE SULFONIC ACID

[72] Inventors: Harold George Burrows; Philip Bierley Ingham, both of Manchester, England

[73] Assignee: Imperial Chemical Industries Limited, London, England

[22] Filed: May 10, 1968

[21] Appl. No.: 728,319

[30] Foreign Application Priority Data

May 16, 1967 Great Britain......................22,723/67

[52] U.S. Cl. .......................260/857 UN, 8/168, 260/78 SC, 264/78
[51] Int. Cl............................................................C08g 41/04
[58] Field of Search...........................260/857; 8/168; 264/78

[56] References Cited

UNITED STATES PATENTS

| | | | |
|---|---|---|---|
| 2,676,896 | 4/1954 | Cohen | 260/857 |
| 3,213,053 | 10/1965 | Kendrick | 260/29.6 |
| 3,281,263 | 10/1966 | Priesing | 117/62 |
| 3,472,819 | 10/1969 | Stephens | 260/857 |
| 3,514,498 | 5/1970 | Okazaki | 260/857 |
| 3,190,763 | 6/1965 | Schleede | 106/186 |

*Primary Examiner*—Paul Lieberman
*Attorney*—Cushman, Darby & Cushman

[57] ABSTRACT

Synthetic linear polyamides which contain a small amount of an alkali metal salt of a polystyrene polysulphonic acid, and dyeing fibers of the said polyamides with Basic Dyestuffs.

3 Claims, No Drawings

DYEABLE POLYAMIDES CONTAINING POLYSTYRENE SULFONIC ACID

This invention relates to synthetic linear fiber-forming polyamides which have excellent affinity for Basic Dyestuffs.

According to the invention there are provided synthetic linear fiber-forming polyamides which contain a small amount of a polystyrene polysulphonic acid or a salt thereof.

Throughout this Specification the term "polystyrene polysulphonic acid" denotes not only polystyrene polysulphonic acid itself but also poly(vinyltoluene)polysulphonic acid and polysulphonic acids of styrene/vinyltoluene copolymers.

The salts of the said polysulphonic acids are preferably the ammonium salts, alkaline earth metal salts such as the calcium and barium salts and, above all, alkali metal salts such as the sodium and potassium salts.

It is preferred that the said polyamides contain the polystyrene polysulphonic acid in the form of a metal salt which is insoluble in water so that the said compounds are not removed from the polyamide during aqueous treatments which are commonly applied to polyamide fibers. It is further preferred that the amount of the said polysulphonic acids which are present in the polyamides is such that the molar ratio of the sulphonic acid groups to the amine end groups present in the polyamide is at least 1:1, but not more than 5:1, and preferably the ratio is between 1.5:1 and 3:1.

The said synthetic linear fiber-forming polyamides are derived from lactams having a ring of from 7 to 13 atoms, or are obtained by polymerizing substantially equimolecular proportions of a diamine which contains at least two carbon atoms between the amino groups and a dicarboxylic acid which contains at least two carbon atoms between the carboxylic acid groups, and copolymers thereof. Preferred polyamides are polyamides from caprolactam and, in particular, polyhexamethylene adipamide, and copolymers thereof.

In this Specification the term "substantially equimolecular proportions" (of the diamine and of the dicarboxylic acid) is used to cover both strict equimolecular proportions of the two types of reactants and the slight departures therefrom which are involved in conventional viscosity stabilizing techniques.

The polyamides of the invention can be obtained by simply mixing the preformed polyamide with the polystyrene polysulphonic acid or a salt thereof, such mixing being carried out while the polyamide is in a solid or molten state just prior to melt-spinning the polyamide into fibers. It is however preferred that the polystyrene polysulphonic acid is incorporated into the polyamide by carrying out the polymerization of the polyamide-forming components in the presence of the polystyrene sulphonic acid or salt thereof.

According to a further feature of the invention there is provided a process for the manufacture of the synthetic linear fiber-forming polyamides as hereinbefore defined which comprises polymerizing a lactam having a ring of from 7 to 13 atoms or the corresponding amino acid, or substantially equimolecular proportions of a diamine which contains at least two carbon atoms between the amino groups and a dicarboxylic acid which contains at least two carbon atoms between the carboxylic acid groups, in the presence of a polystyrene polysulphonic acid or a salt thereof.

The process of the invention can be carried out under the conditions normally employed for polymerizing polyamide-forming components, the said polystyrene polysulphonic acid, or salt thereof, being added at any stage of the polymerization. It is however preferred to add the polysulphonic acid during the initial stages of the polymerization, and preferably at the stage of charging the reactants to the polymerization vessel.

When starting from a substantially equimolecular proportion of a diamine and a dicarboxylic acid the said compounds can be used in the form of a salt of each other; thus, for example, hexamethylene diammonium adipate can be used instead of a mixture of equimolecular proportions of adipic acid and hexamethylenediamine. Under the conditions of the polymerization the said salts dissociate into the diamine and the dicarboxylic acid which then react together to form the polyamide.

Polymerization is preferably carried out at a temperature between 200° C. and 350° C. until the required degree of polymerization is obtained.

As examples of the said polymerizable lactams, or aminoacids thereof, there may be mentioned ε-aminocaproic acid, caprolactam, 9-aminononanoic acid, 11-aminoundecanoic acid, dodecanolactam, 17-aminoheptadecanoic acid and enantholactam.

As examples of the said diamines there may be mentioned m- or p-xylylenediamine, but preferably diamines of the general formula $H_2N(CH_2)_pNH_2$ wherein $p$ is an integer of from 2 to 8, such as trimethylenediamine, tetramethylenediamine, pentamethylenediamine, octamethylenediamine and, above all, hexamethylenediamine.

As examples of the said dicarboxylic acids there may be mentioned isophthalic acid and terephthalic acid, but preferably the dicarboxylic acids of the formula HOOC.Y.COOH wherein Y is a divalent aliphatic radical containing at least 2 carbon atoms, and as examples of such acids there may be mentioned sebacic acid, octadecanedioic acid, suberic acid, azelaic acid, undecanedioic acid, glutaric acid, pimelic acid and, above all, adipic acid.

If desired other ingredients, such as delustrants, light stabilizers, heat stabilizers, fillers and molecular weight regulators, which are commonly present in fiber-forming polyamides, can be added at any stage of the polymerization process.

The polyamides of the invention can be converted into fibers by any of the conventional methods of producing fibers from polymers, for example by melt spinning. The resulting fibers have excellent affinity for Basic Dyestuffs, (such as are described on pages 1617 to 1654 of the Second Edition of the Color Index which was published in 1956), and this affinity is much greater than that of fibers obtained from the corresponding polymers which were prepared in the absence of the said polysulphonic acids. The resulting fibers have little or no affinity for Acid Dyestuffs, and when these fibers are mixed with fibers of normal polyamides and/or of polyamides which have improved affinity for Acid Dyestuffs and the resulting unions are dyed with Acid Dyestuffs, contrasting multi-colored patterned effects are obtained.

The invention is illustrated but not limited by the following Examples in which the parts and percentages are by weight.

EXAMPLE 1

6.85 parts of a polystyrene polysulphonic acid containing 7.4 percent of sulphur, and a solution of 0.8 part of sodium hydroxide in 40 parts of water are charged to a stainless steel autoclave. 262 parts of hexamethylene diammonium adipate and 0.73 part of adipic acid are added, the autoclave is sealed, then heated to 100° C. The autoclave is then purged with steam, and heating is continued until a pressure of 250 pounds per sq. in. (p.s.i.) and a temperature of 220° C. is obtained. Heating is then continued until a temperature of 240° C. is obtained while the pressure is maintained at 250 p.s.i. by a slow release of steam from the autoclave. The pressure in the autoclave is then slowly reduced to atmospheric pressure while the temperature is raised to 270° C. After 20 minutes at this temperature the polymer is discharged from the autoclave and converted by melt-spinning into fibers.

The resulting fibers have excellent affinity for Basic Dyestuffs when applied from an aqueous dyebath, and this affinity is much higher than that of fibers obtained from a polymer which was prepared as described above except that the polystyrene polysulphonic acid and the sodium hydroxide were omitted from the autoclave.

A similar result is obtained if the 0.8 part of sodium hydroxide used in the above Example is replaced by 1.12 parts of potassium hydroxide.

EXAMPLE 2

2 parts of the sodium salt of a polystyrene polysulphonic acid containing 5.7 percent of sulphur, in finely divided form, is mixed with 98 parts of polyhexamethylene adipamide in the form of chip. The resulting mixture is stirred for 30 minutes at 280° C. under an atmosphere of nitrogen, and the product is then spun into filaments.

These filaments have a much higher affinity for Basic Dyestuffs than filaments prepared from the polyhexamethylene adipamide used as starting material in this Example.

By increasing the amount of the sodium salt of the polystyrene polysulphonic acid to 4 percent, polyamide filaments having an even higher affinity for Basic Dyestuffs are obtained.

EXAMPLE 3

42 parts of hexamethylene diammonium adipate and 7 parts of the sodium salt of a polystyrene polysulphonic acid containing 5.7 percent of sulphur were milled together for 24 hours in the presence of 500 parts of ¼ inch diameter stainless steel balls. The resulting mixture was then sieved through a 60 mesh sieve to remove the steel balls.

28 parts of the sieved mixture and 72 parts of hexamethylene diammonium adipate are charged to a reaction vessel, and the air displaced by nitrogen. The mixture is then heated for 30 minutes at 275° C. under a reflux condenser. Heating is continued for a further 60 minutes at 275° C., the water present being allowed to distil off, and the mixture is then heated for 15 minutes at 275° C. under a pressure of 20 mms. of mercury. The resulting polyamide is then cooled and converted into the form of chips.

The chips are then converted into filaments by melt spinning. These filaments have a much higher affinity for Basic Dyestuffs than filaments of the polyamide which were obtained by polymerizing hexamethylene diammonium adipate on its own under the above conditions.

EXAMPLE 4

The polymerization process of Example 3 is repeated except that there are used 7 parts of the sieved mixture of hexamethylene diammonium adipate and the sodium salt of the polystyrene polysulphonic acid and 93 parts of hexamethylene diammonium adipate.

The resulting polyamide filaments have excellent affinity for Basic Dyestuffs.

EXAMPLE 5

The polymerization process of Example 3 is repeated except that there are used a milled mixture of 12 parts of hexamethylene diammonium adipate and 2 parts of the sodium salt of a polystyrene polysulphonic acid containing 4.4 percent of sulphur, 8.2 parts of hexamethylene diammonium adipate and 6 parts of hexamethylene diammonium terephthalate.

The resulting filaments of the copolyamide have a much higher affinity for Basic Dyestuffs than filaments of the copolyamide which were obtained by similarly polymerizing together the same proportions of the hexamethylene diammonium adipate and terephthalate in the absence of the sodium salt of the polystyrene polysulphonic acid.

EXAMPLE 6

In place of the 82 parts of hexamethylene diammonium adipate and 6 parts of hexamethylene diammonium terephthalate used in Example 5 there are used respectively 77.3 parts and 10.7 parts of the same compound.

The filaments of the resulting copolyamide have an excellent affinity for Basic Dyestuffs.

EXAMPLE 7

In place of the 82 parts of hexamethylene diammonium adipate and 6 parts of hexamethylene diammonium terephthalate used in Example 5 there are used respectively 70.5 parts and 17.5 parts of the same compounds.

The filaments of the resulting copolyamide have an excellent affinity for Basic Dyestuffs.

EXAMPLE 8

In place of the quantities of hexamethylene diammonium terephthalate used in each of Examples 5, 6 and 7 there are used the same amounts of hexamethylene diammonium isophthalate.

The filaments of the resulting copolyamides have a much higher affinity for Basic Dyestuffs than filaments of the corresponding copolyamides which were similarly prepared by copolymerizing together the same amounts of hexamethylene diammonium adipate and hexamethylene diammonium isophthalate in the absence of the sodium salt of the polystyrene polysulphonic acid.

We claim:

1. A process for improving the affinity for basic dyestuffs of a fiber formed from a fiber-formable synthetic linear polyamide of a lactam having a ring of from 7 to 13 carbon atoms or the corresponding amino acid, or substantially equimolecular portions of a diamine which contains at least two carbon atoms between the amino groups and a dicarboxylic acid which contains at least two carbon atoms between the carboxylic acid groups, and copolymers thereof, which comprises forming a spinnable mixture of said fiber-formable polyamide with a polystyrene polysulphonic acid in an amount so that the molar ratio of sulphonic acid groups to amine end groups present in the polyamide is about 1:1 to 5:1 and spinning said mixture into a fiber.

2. The process of claim 1 wherein said polyamide is polymerized in the presence of said polystyrene polysulphonic acid to form said mixture.

3. The process of claim 1 wherein said polystyrene polysulphonic acid is mixed with a preformed polyamide to form said mixture.

* * * * *

UNITED STATES PATENT OFFICE
CERTIFICATE OF CORRECTION

Patent No. 3,665,054     Dated May 23, 1972

Inventor(s) Harold George Burrows; Phillip Bierley Ingham

It is certified that error appears in the above-identified patent and that said Letters Patent are hereby corrected as shown below:

Claim 1, line 1, cancel the word "carbon".

Signed and Sealed this

Third Day of August 1976

[SEAL]

Attest:

RUTH C. MASON
*Attesting Officer*

C. MARSHALL DANN
*Commissioner of Patents and Trademarks*